Figure 1:
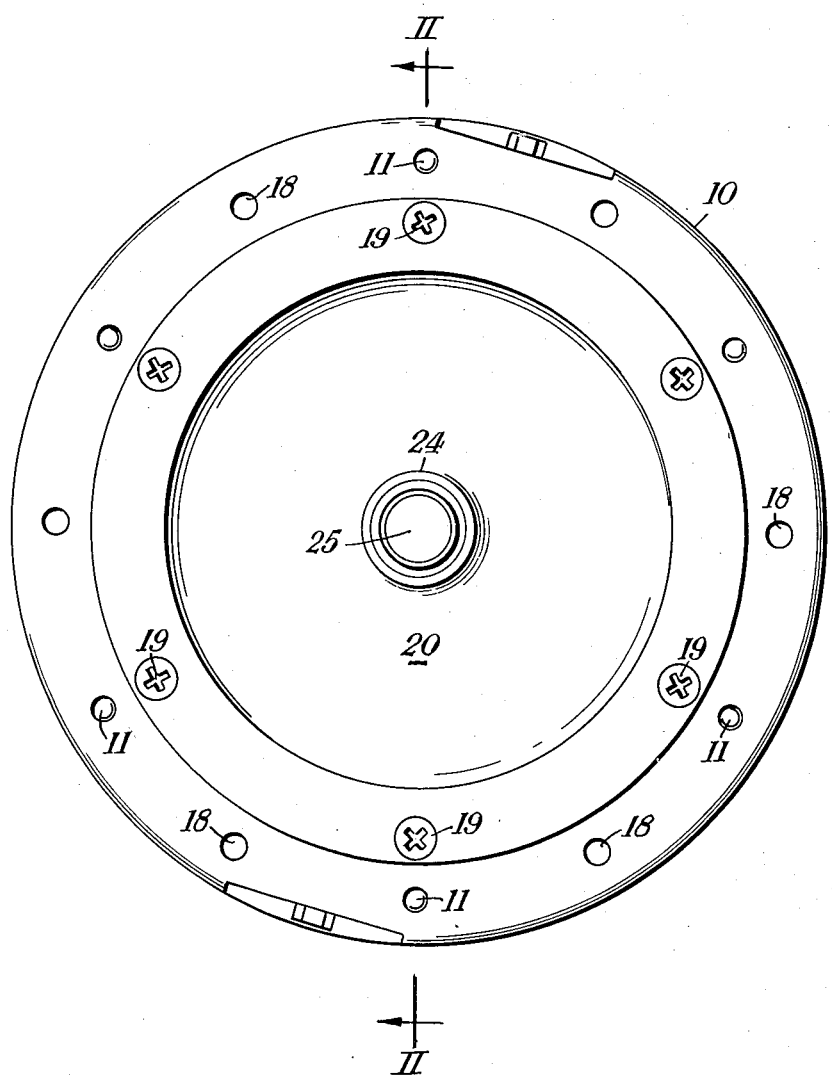

Dec. 27, 1960   S. RICHARDS   2,966,362
CHUCKS FOR MACHINE TOOLS
Filed Sept. 11, 1959   3 Sheets-Sheet 1

Inventor
Stanley Richards
By Moses, Nolte + Nolte
Attorneys

Dec. 27, 1960  S. RICHARDS  2,966,362
CHUCKS FOR MACHINE TOOLS
Filed Sept. 11, 1959  3 Sheets-Sheet 2

United States Patent Office 2,966,362
Patented Dec. 27, 1960

2,966,362

CHUCKS FOR MACHINE TOOLS

Stanley Richards, Blakenhall, Wolverhampton, England, assignor to Integral Limited, Wolverhampton, England, a company of Great Britain Filed Sept. 11, 1959, Ser. No. 839,461

Claims priority, application Great Britain July 1, 1959

6 Claims. (Cl. 279—4)

In United States Patent No. 2,854,237 I have described and claimed a diaphragm chuck comprising a body portion, work-holding jaws mounted on the front surface of a diaphragm which is fixed at its periphery to the body portion, a second diaphragm also fixed at its periphery to the body portion and mounted behind the work-holding diaphragm, a plunger extending forwardly from the second diaphragm for actuating the work-holding diaphragm to open the jaws, and at least one operating piston of small area movably mounted in the body portion behind the second diaphragm, and operable to impart forward movement to the second diaphragm through the intermediary of liquid trapped between said piston and the second diaphragm.

In such a chuck, on application of operating pressure to the piston or pistons a magnified hydrostatic pressure is applied to the second diaphragm, causing its plunger to deflect the work-holding diaphragm to open the jaws thereon.

The present invention provides a modified form of diaphragm chuck which again involves the use of magnified hydrostatic pressure to actuate the jaws but in which the jaws are arranged to engage a cavity in the workpiece and in which accordingly the jaws are arranged to move inwards on application of pressure to the operating piston.

The chuck according to the invention comprises a work-holding diaphragm which is fixed at its periphery and carries jaws for engaging a cavity in a workpiece, a second diaphragm which is also fixed at its periphery and is operatively connected to the centre of the work-holding diaphragm and an operating piston of small area which is movable in the chuck to apply to the second diaphragm, through the intermediary of liquid trapped in the chuck between said piston and the second diaphragm, movement in the direction to cause inward movement of the jaws. The area of the operating piston is small in comparison with that of the second diaphragm so that application of operating pressure to the piston will apply a magnified hydrostatic pressure to the second diaphragm, causing it to deflect the work-holding diaphragm to cause inward movement of the jaws.

Preferably the chuck includes a plate having the work-holding diaphragm attached to its front surface and the second diaphragm attached to its rear surface, the second diaphragm having a boss extending forwardly through a hole in the plate and attached to the central portion of the work-holding diaphragm and a rearwardly extending tubular projection and the piston being mounted in said tubular projection.

Figure 2:
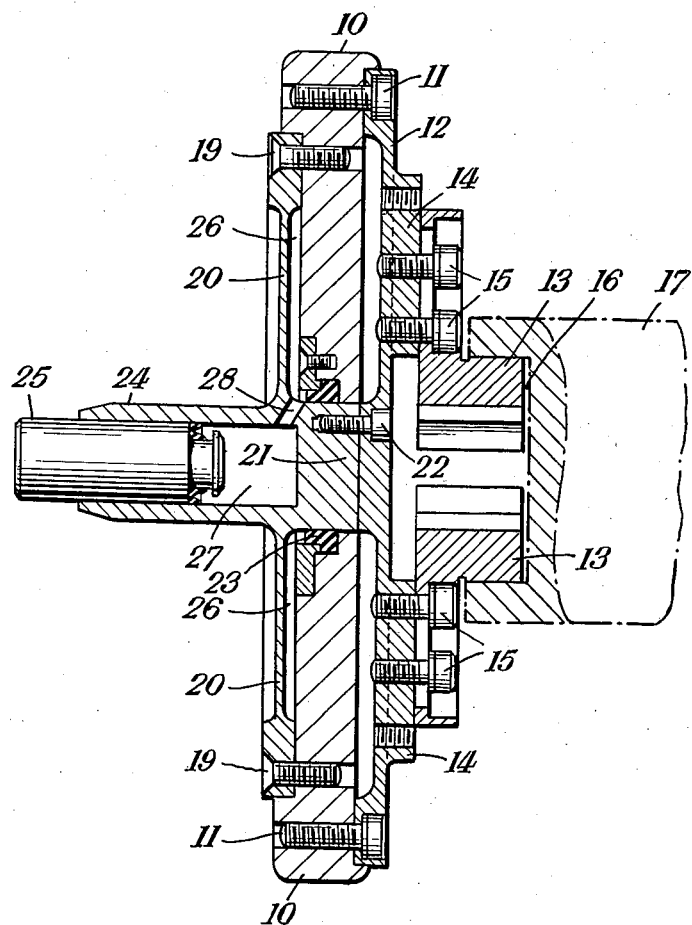
Figure 3:
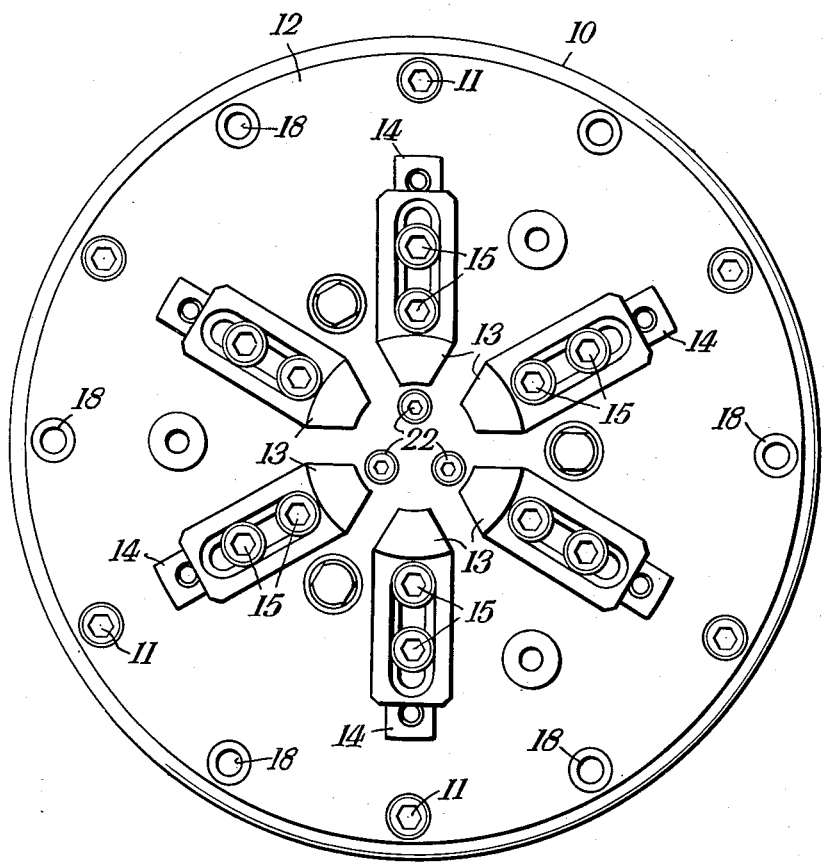

One specific embodiment of chuck according to the invention will now be described in more detail, by way of example, with reference to the accompanying drawings, in which:

Fig. 1 is a rear elevation of the chuck,
Fig. 2 is a section on the line II—II in Fig. 1 and
Fig. 3 is a front elevation of the chuck.

The chuck includes a plate 10, to which is fixed at its periphery by screws 11 a work-holding diaphragm 12. The diaphragm 12 carries six jaws 13 which are mounted on slides 14 so that they may be adjusted radially on the diaphragm 12 and locked in position by screws 15. The jaws 13 are adapted to engage by their outer surfaces in a cavity 16 in a workpiece 17 indicated in Fig. 2. Holes 18 are provided in the plate 10 to enable it to be attached to a tool head.

Attached at its periphery by screws 19 to the rear face of the plate 10 is another diaphragm 20 having a forwardly extending boss 21 which projects through a hole in the plate 10 and is attached by screws 22 to the diaphragm 12. A sealing ring 23 is provided between the boss 21 and the plate 10 and the diaphragm 20 has a tubular rearward extension 24 in which is slidably mounted an operating piston 25. The spaces 26, 27, which communicate via a passage 28, are filled with liquid.

On application of finger pressure to the piston 25 a magnified hydrostatic pressure will be applied to the diaphragm 20 causing it to move rearwardly (i.e. to the left in Fig. 2) drawing the central portion of the diaphragm 12 with it and so causing the jaws 13 to move inwards to a slight extent. As soon as the workpiece has been fitted over the jaws 13, the pressure on the piston 25 is released. The jaws 13 then spring outwardly to engage and hold the workpiece.

What I claim as my invention and desire to secure by Letters Patent is:

1. A chuck of a type for engaging a workpiece by the exterior periphery of jaws which extend into a cavity of the workpiece, comprising a work-holding diaphragm which is fixed at its periphery and carries jaws for engaging a cavity in a workpiece, a second diaphragm which is also fixed at its periphery and is operatively connected to said work-holding diaphragm, and means to direct operating fluid against at least one of said diaphragms including an operating piston of small area which is movable in the chuck to move said diaphragms in the direction to cause inward movement of the jaws.

2. A chuck according to claim 1, including a plate having an opening and having said work-holding diaphragm attached to one face and said second diaphragm attached to its opposite face, said second diaphragm having a boss extending forwardly through said plate opening and attached to the central portion of the work-holding diaphragm, said means to direct operating fluid against at least one of said diaphragms including a rearwardly extending tubular projection, said piston being slidably mounted in said tubular projection.

3. A chuck comprising a plate member, a first work-holding diaphragm secured at its periphery to one side of said plate member, said diaphragm carrying outwardly extending jaws for positioning in a cavity of a workpiece and for engaging the workpiece by the exterior periphery of said jaws, a second diaphragm secured at its periphery to the other side of said plate and defining with said plate a space therebetween, said second diaphragm including a portion operatively connected to said first diaphragm, and cylinder and piston means connected to the space between said plate and said second diaphragm whereby relative movement of said piston and cylinder will pressurize the space between said plate and said second diaphragm and deflect said second diaphragm in a direction away from said plate and said first diaphragm toward said plate to cause the latter to move the exterior periphery of said jaws inwardly to release the workpiece.

4. A chuck according to claim 3, wherein said plate has an opening therethrough and said second diaphragm includes a portion which extends through the opening of said plate member.

5. A chuck according to claim 3, wherein said second diaphragm includes a tubular portion extending laterally outwardly, passage means defined between the interior of said tubular member and the space between said second diaphragm and said plate member, and a piston slidable in said tubular member.

6. A chuck according to claim 3, wherein said jaws include a plurality of spaced jaw elements arranged in a substantial circle and connected to said first diaphragm whereby flexing of said diaphragm is effective to move jaw elements radially inwardly and outwardly.

References Cited in the file of this patent

UNITED STATES PATENTS 2,854,237    Richards _____ Sept. 30, 1958